May 5, 1964  E. NEANDER ETAL  3,132,291
SINE-COSINE MOTOR DRIVEN FLAME CUTTING APPARATUS
Filed June 30, 1959  2 Sheets-Sheet 1
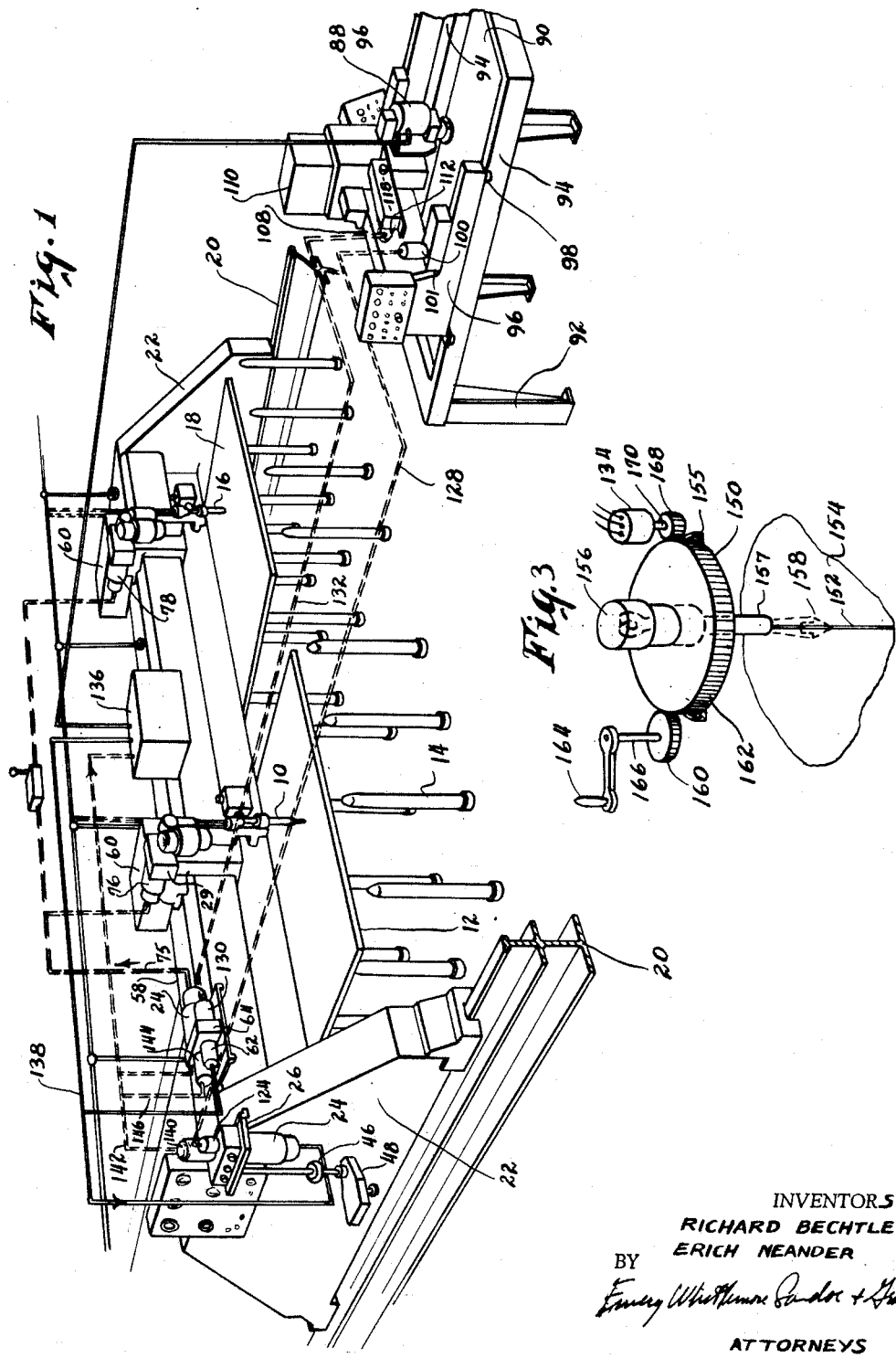
INVENTORS
RICHARD BECHTLE
ERICH NEANDER
BY
ATTORNEYS

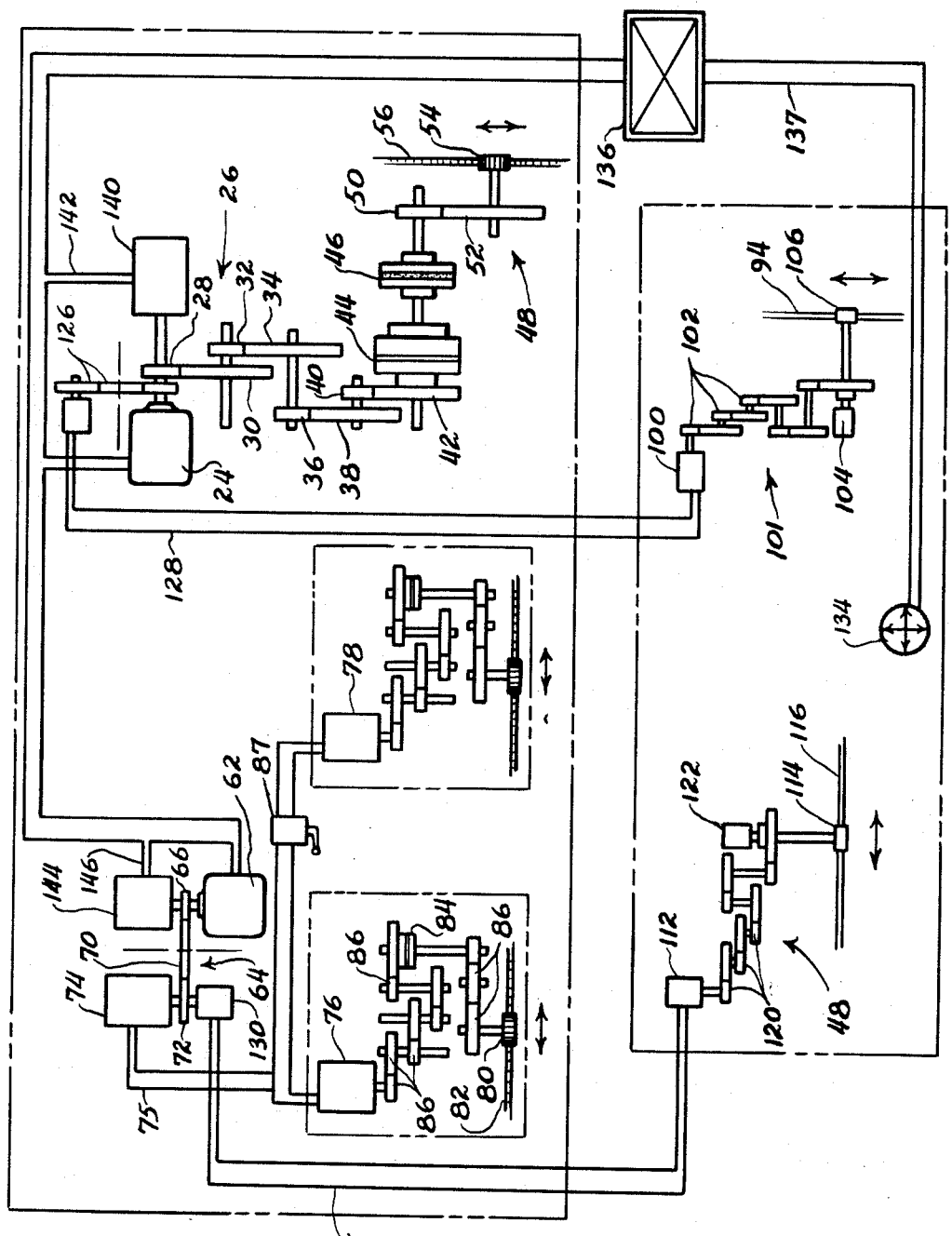

United States Patent Office 3,132,291
Patented May 5, 1964

3,132,291
SINE-COSINE MOTOR DRIVEN FLAME
CUTTING APPARATUS
Erich Neander, Weisskirchen, Oberursel, Germany, and
Richard Bechtle, Schone Aussicht 24, Niederhochstadt,
Main-Taunus Kreis, Germany
Filed June 30, 1959, Ser. No. 824,110
1 Claim. (Cl. 318—19)

This invention relates to control apparatus, and more particularly, to a control apparatus for moving a tool at a predetermined velocity over a path synchronously related to a scale drawing of said path.

In manufacturing operations, such as the cutting out of sections of steel material by a flame cutting torch, it is desirable to move the torch along the outline path at the maximum permissible velocity.

However, in the control devices known to the art, changes in direction of movement of the cutting torch is accompanied by change of torch velocity. To limit the highest velocity obtained in traversing a variable path to the maximum permissible velocity, the torch is operated below the optimum velocity over much of the variable path, resulting in lowered efficiency.

Further, the increase in width of steel now being rolled coupled with the desirability of cutting large parts from such plates has increased the forces necessary to move the torch along the controlled path. The increased forces exceeds those obtainable from a roller frictionally contacting a templet and use of such systems is undesirable.

Additionally, the large physical size of the steel plates and the parts to be cut therefrom makes the use of full scale drawings and/or templets awkward inpracticable.

It is, therefore, one object of this invention to provide an improved method and means for moving a working tool in accordance with a scale drawing.

It is a further object of this invention to provide means for moving a working tool over a large work piece in accordance with a synchronously moved sensor moved over a scale drawing.

It is a further object of this invention to provide an apparatus drive wherein the longitudinal and transverse speeds are related to maintain the speed of the working tool over the surface at a constant selectable speed.

It is a further object of this invention to provide means for moving a tool along a path at a constant speed and to vary the direction of movement by a controlled signal generator.

It is a further object of this invention to provide a means for producing parts cut from plate material by making an outline thereof on a scale drawing by tracing said drawing by a photoelectric sensor moving thereover and by reproducing sensor movement by a synchronously moving tool.

Other objects and advantages will appear hereinafter.

In accordance with these objects I have provided in a preferred embodiment of this invention a working tool, such as a cutting torch, movably mounted in operable relationship to the worked apparatus, such as plate material. Means are provided to drive the tool along a first axis and means are provided to drive the tool along a second axis perpendicular to said axis. A sensor is synchronously driven along a first and second axis in accordance with movement of said working tool.

A function generator in the sensor generates a first and second control signal to control the speeds of the respective first and second drive motors. The first and second signals are related respectively to the sine and cosine of the angular rotation of the resolver rotor. The rotor is rotated as the sensor movement deviates from the path on the scale drawing to drive the tool and the synchronously driven sensor back on the desired path. Since the drive along the coordinate axis are related respectively by the sine and cosine of an angular function, the speed of movement of the tool and the sensor remains constant.

A preferred embodiment of this invention is shown in the accompanying drawing of which:

FIGURE 1 is a perspective view of the driving apparatus and the controlling sensor apparatus in accordance with this invention;

FIGURE 2 is a schematic drawing of the apparatus shown in FIGURE 1; and

FIGURE 3 is an enlarged perspective view of one form of sensor suitable for use with the apparatus shown in FIGURE 1.

Referring to FIGURES 1 and 2 there is shown a flame cutting torch 10 positioned above a work piece such as the steel plate 12 in cutting relationship thereto. The sheet material is supported by a plurality of upstanding supports 14 which are capable of resisting the heat impinging thereon when the cutting torch cuts through the material.

In many applications it is convenient to have a second cutting torch 16 positioned above a second work piece 18 in cutting relationship thereto. The second torch may be slaved to the movement of the tool 10 so that two simultaneous cuts can be made when two work pieces are to be processed. The second tool may be slaved to produce a mirror image of the path of the first tool to cut a second work piece or an extension of the first work piece 12. It will be understood that the second torch 16 may be disabled when the first work piece 12 extends across the entire working area and is to be cut by a single torch.

Positioned on either side of the working area in parallel relationship are longitudinally extending rails 20. Ends trucks 22 house supporting wheels in rolling contact with the rails and are adapted to move thereover.

In order to drive the end trucks longitudinally along the rails, there is provided a longitudinal drive motor 24. Motor 24 is preferably a variable speed, high torque, reversible motor. Power from the motor 24 is transmitted through a suitable speed reduction transmission 26, comprising a gear train 28 to 42, an electromagnetic clutch 44, a flexible coupling 46, a second transmission 48 comprising gears 50 and 52, to a longitudinal drive gear 54. For precise control of torch movement it is preferable that gear 54 engage a rack 56 extending parallel with the rails 20. However, in some applications the gear 54 may be replaced by a drive wheel in frictional contact with the rail surface.

The reduction transmission reduces the torque requirements of the motor. Also, since the motor speed is controlled by a servo loop, as will be more fully explained in subsequent portions of the specification, the rotation speed reduction of the reduction transmission provides for precise control of rate of movement of the end trucks.

The electromagnetically operated clutch allows the driving mechanism on the trucks to be decoupled from the motor drive to allow physical movement of the end trucks without rotation of the electric motor and the associated servos.

Extending between the end trucks is a transverse bridge 58 upon which are mounted transversely movable tool carrier trucks 60. To provide for transverse movement of the trucks, there is provided a transverse drive motor 62 which is preferably a variable speed, high torque motor. The transverse drive motor is coupled through a transmission 64 comprising gears 66, 70 and 72 to a totalizing synchro 74. The totalizing synchro is electrically coupled over leads 75 to the slave synchros 76 and 78 on the transversely movable trucks. Rotation of the totalizing synchro 74 will be reflected by simultaneous and identical electrical rotation of both slave synchros 76 and 78.

Each slave synchro is coupled to a drive pinion 80, engaging a rack 82 extending along the bridge, through an electromagnetic clutch 84 and a suitable speed reduction transmission comprising gears 86.

The reduction gearing lowers the torque applied to the slave synchro. Since synchros are sensitive to applied torque, reducing the torque requirement allows simpler servo loops without danger of slippage and locking on a false null.

Thus rotation of the transverse drive motor is reflected in synchronously driven movement of each transverse drive truck through the servo loop connection. If it is desired that the tool 16 be moved over a path which is the mirror image of the path over which tool 10 is moved, the polarity of the electrical connection between master and slave synchro is reversed by throwing switch 87.

In order to provide a means for driving the cutting torches over a path synchronously related to a path imprinted on a scale drawing, there is provided a sensor 88 for scanning the scale drawing. The sensor is mounted for movement over the scale drawing at a rate related to torch movement by the same ratio as the scale drawing bears to the desired torch path.

The sensor 88 is mounted in scanning relationship over a scale drawing 90 positioned upon the bed of table 92. Extending longitudinally of the scale drawing are tracks 94 upon which are movably mounted end trucks 96. The end trucks comprise idler wheels 98 in rolling engagement with the track 94. A slave synchro 100 is mounted thereon to drive the end trucks longitudinally of the drawing through a speed reduction transmission 101 comprising gears 102, electromagnetic clutch 104 and a driving wheel 106 in engagement with the track 94. The driving wheel may be replaced by a pinion in engagement with a longitudinally extending rack in many applications.

Extending between the end trucks is a transverse bridge 108 upon which is mounted the transversely movable truck 110 carrying the sensor 88. To move the truck transversely over the scale drawing there is provided a slave synchro 112 coupled to a drive wheel 114 in engagement wtih a transverse track 116 through a transmission 118 comprising gears 120. An electromagnetic clutch 122 is provided in the transmission to releasibly engage the transmission. Again, it will be noted that the wheel 114 may also comprise a pinion engaging a transversely extending rack.

Movement of the torch and the sensor is synchronously related in the longitudinal aspect by a servo loop coupling. The coupling comprises a master synchro 124 mechanically coupled to the longitudinal torch drive motor through a transmission comprising gears 126 and electrically coupled to the slave synchro 100 on the sensor through lead 128.

Similarly, transverse movement of the sensor and torch is synchronously related through a servo loop. A master synchro 130 is mechanically coupled to the torch transverse drive motor 62 through transmission 64 and electrically coupled to the transverse slave synchro 112 on the sensor through electrical lead 132.

As thus described, the cutting torch is driven over a path determined by the relative speeds and direction of rotation of the longitudinal and transverse drive motors. Any movement of the torch is reflected in movement of the sensor along a path synchronously related to the movement of the torch in the same ratio as the scale ratio of the drawing.

In order to control the movement of the torch and the sensor along the desired path the sensor generates control signals to regulate the speed of the drive motors for the coordinate axis. The operation of the signal generation is best seen by reference to FIGURES 2 and 3 together.

In the figures there is shown a resolver 134 mounted in the sensor. The resolver will generate two signals; a first signal the amplitude of which varies as the sine of the angular movement of the rotor, and a second signal the amplitude of which varies as the cosine of the angular movement of the rotor. One of the signals is employed to control the speed and direction of rotation of the longitudinal drive; the other is employed to control the speed and direction of rotation of the transverse drive.

The function signals from the sensor are applied to a control amplifier 136 over lead 137. The control amplifier is a phase sensitive power amplifier which will apply a control signal to the associated drive motor to control the speed thereof in accordance with the amplitude of the applied function signal and control the direction of drive motor rotation in accordance with the phase of the function signal. To provide for precise control of drive motor rotation speed, a tachometer-generator 140 and 144 is coupled respectively to the shaft of the longitudinal motor 24 and the transverse drive motor 62. The signal therefrom is fed back to the control amplifier in bucking relationship to the effective function signal to establish a control loop of requisite precision and stability.

Thus, there is provided a sensor having a function generator which will generate a first and second control signal respectively related by the sine and cosine of the same angular function. The sine function signal is employed to control the speed of the drive along one axis, such as the longitudinal axis. The cosine function signal is used to control the speed of the drive along the other axis, such as the transverse axis. The speed control circuitry includes a tachometer-generator to provide a precise and stable control loop. Since the cutting torch is driven along the coordinate axes at rates related by sinusoidal functions, the speed of the cutting torch is maintained a constant since the vector addition of the drives is a constant (i.e., $sine^2\ \theta$ plus $cosine^2\ \theta$ equals 1). The speed of the cutting torch can then be adjusted to the maximum permissible speed for the conditions of operation by suitable gear ratios and potentiometer controls in the control amplifier. Thereafter, movement of the torch is maintained at the maximum permissible rate despite change in path direction and efficient operation results.

Any movement of the torch is reflected in synchronously related movement of the sensor. To relate the function signal to the drawing path, there is provided, in the sensor, a rotatable plate 150 mounted above the path 152 imprinted on the scale drawing 154. The plate is rotatable in its mounting bracket 155. A light source 156 is mounted at the axis of rotation of plate 150 and has an associated optical system 157 and mask to cast an identifiable image such as an arrow 158 upon the path 152. To turn the plate 150 there is provided pinion 160 engaging the annular gear 162 on plate 150. Pinion 160 is adapted to be manually rotated by rotation of crank 164 to the shaft 166 of which is affixed pinion 160. Rotation of the plate 150 results in change in the function signal generated by resolver 134 since the rotor thereof is rotated through the coaction of pinion 158 on the rotor shaft 170 with the gear 162 on the plate.

Thus, as the sensor is driven along the path of the scale drawing in synchronism with the moving torch, the operator need only keep the arrow aligned with the desired path. If the path turns, turning of the arrow will cause generation of resolver signals changing the direction of the torch and the sensor to move along the desired path.

In many applications, it is desirable that the sensor automatically follow the imprinted path. In such applications, use of the sensor disclosed in Patent No. 3,069,550, entitled Photoelectric Apparatus Employing Side by Side Photocells, may advantageously be employed. Also various steering photoelectric cell drives may be employed if the drive turns the photocell to follow the desired path.

It will also be noted that some applications will require drive of the torch along rectilinear paths. In such cases the function signals are fixed at a predetermined magnitude and can be set into the control amplifier by hand or simple computors.

It will be understood that the invention may be variously embodied and modified within the scope of the subjoined claim.

What is claimed is:

Apparatus for cutting a sheet of material in accordance with a path imprinted on a scale drawing which comprises a cutting torch mounted in cutting relationship above said sheet, a torch rail on each side of said sheet, said torch rails being parallel, a torch truck mounted on each of said torch rails, a torch bridge extending between and supported by said torch trucks, said torch bridge being carried at right angles to said torch rails, means for movably mounting said torch on said torch bridge, a sensor positioned over said scale drawings, a sensor rail on each side of said scale drawing in parallel disposition, a sensor truck mounted on each of said rails, a sensor bridge extending between and supported by said sensor trucks, said sensor bridge being at right angles to said sensor rails, longitudinal torch drive motors to drive said torch trucks along said rails, a first synchro system to drive said sensor trucks in response to movement of said torch trucks so that the distance moved by said sensor trucks bears the same ratio to the distance moved by said torch trucks as the dimension of the scale path bears to the cut, a transverse torch drive motor to drive said torch along said bridge, a second synchro system to drive said sensor along the sensor bridge in response to movement of the torch along the torch bridge so that the distance moved by the sensor bears the same ratio to distance moved by the torch as the dimensions of the scale path to the cut, said sensor including a projector to project a vector representation on the scale drawing, said projector being rotatably mounted, a resolver coupled to said projector to generate a first signal, the amplitude of which varies as the sine of the angle of rotation of said vector from a predetermined angular reference, and a second signal which varies as the cosine of said angular function, means including a tachometer generator for coupling said first signal to said longitudinal torch drive motors in speed control relationship, means including a tachometer generator for coupling said second signal to said transverse torch drive motors in speed control relationship, the resultant speed of movement of said torch being constant at a desired efficient operating speed and the direction of movement of said torch and slaved sensor being controllably guided by alignment of the projected vector representation with the guide path on said scale drawings.

References Cited in the file of this patent

UNITED STATES PATENTS

| | | |
|---|---|---|
| 2,261,644 | Cockrell | Nov. 4, 1941 |
| 2,679,620 | Berry | May 25, 1954 |
| 2,784,359 | Kamm | Mar. 5, 1957 |

FOREIGN PATENTS

| | | |
|---|---|---|
| 1,018,967 | Germany | Nov. 7, 1957 |